United States Patent
Eiland et al.

(10) Patent No.: US 8,375,446 B2
(45) Date of Patent: *Feb. 12, 2013

(54) INTRUSION DETECTION USING MDL COMPRESSION

(75) Inventors: Edward E. Eiland, Niskayuna, NY (US); Scott C. Evans, Burnt Hills, NY (US); Thomas S. Markham, Niskayuna, NY (US); Jeremy D. Impson, Vestal, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 897 days.

This patent is subject to a terminal disclaimer.

(21) Appl. No.: 12/398,432

(22) Filed: Mar. 5, 2009

(65) Prior Publication Data

US 2010/0107255 A1    Apr. 29, 2010

Related U.S. Application Data

(63) Continuation of application No. 12/260,627, filed on Oct. 29, 2008.

(51) Int. Cl.
G06F 11/00 (2006.01)

(52) U.S. Cl. ............................... 726/23; 726/25

(58) Field of Classification Search ............ 726/23, 726/24, 25, 26
See application file for complete search history.

(56) References Cited

U.S. PATENT DOCUMENTS

| | | | |
|---|---|---|---|
| 5,903,676 A | 5/1999 | Wu et al. | |
| 5,956,676 A | 9/1999 | Shinoda | |
| 6,189,005 B1 | 2/2001 | Chakrabarti et al. | |
| 6,601,048 B1 | 7/2003 | Gavan et al. | |
| 6,782,377 B2 | 8/2004 | Agarwal et al. | |
| 7,007,035 B2 | 2/2006 | Kamath et al. | |
| 7,089,592 B2 | 8/2006 | Adjaoute | |
| 7,134,141 B2 | 11/2006 | Crosbie et al. | |
| 7,146,643 B2* | 12/2006 | Dapp et al. | 726/23 |
| 7,254,273 B2 | 8/2007 | Sakanashi et al. | |
| 7,313,817 B2 | 12/2007 | Evans et al. | |
| 7,409,716 B2* | 8/2008 | Barnett et al. | 726/23 |
| 7,472,418 B1* | 12/2008 | McCorkendale et al. | 726/24 |
| 7,616,132 B2* | 11/2009 | Chan et al. | 341/50 |
| 7,937,334 B2* | 5/2011 | Bonissone et al. | 706/11 |
| 2004/0157556 A1* | 8/2004 | Barnett et al. | 455/41.2 |
| 2004/0157557 A1* | 8/2004 | Barnett et al. | 455/41.2 |
| 2004/0250128 A1 | 12/2004 | Bush et al. | |
| 2005/0185668 A1* | 8/2005 | Williamson et al. | 370/464 |
| 2005/0273274 A1* | 12/2005 | Evans et al. | 702/20 |
| 2007/0087756 A1 | 4/2007 | Hoffberg | |
| 2007/0233735 A1* | 10/2007 | Han et al. | 707/104.1 |
| 2007/0240222 A1* | 10/2007 | Tuvell et al. | 726/24 |

(Continued)

FOREIGN PATENT DOCUMENTS

WO    WO 2005/055073 A1    6/2005

OTHER PUBLICATIONS

Eiland et al , An application of information Theory to intrusion detection, 2006 IEEE computer society.*

(Continued)

*Primary Examiner* — Eleni Shiferaw
*Assistant Examiner* — Abu Sholeman
(74) *Attorney, Agent, or Firm* — Ronald E. Prass, Jr.; Prass LLP

(57) ABSTRACT

An intrusion masquerade detection system and method that includes a grammar inference engine. A grammar-based Minimum Description Length (MDL) compression algorithm is used to determine a masquerade based on a distance from a threshold in a model of an estimated algorithmic minimum sufficient statistic.

20 Claims, 8 Drawing Sheets

U.S. PATENT DOCUMENTS

| | | | |
|---|---|---|---|
| 2008/0016314 A1 | 1/2008 | Li et al. | |
| 2009/0021403 A1* | 1/2009 | Chan et al. | 341/50 |
| 2009/0055425 A1* | 2/2009 | Evans et al. | 707/102 |
| 2009/0296583 A1* | 12/2009 | Dolezilek | 370/241 |
| 2011/0214161 A1* | 9/2011 | Stolfo et al. | 726/4 |

OTHER PUBLICATIONS

Adam Laczo et al , MDL Comress for intruion detection: signature inference and Masquerade attack, 2007 IEEE,p. 1-7.*

Axellson S., "The Base-Rate Fallacy and the Difficulty of Intrusion Detection", Transactions on Information and System Security, 2000, 3:3, pp. 186-205.

A. Liu, C. Martin, T. Hetherington and S. Matzner, "A Comparison of System Call Feature Representations for Insider Threat Detection", Proceedings of the 2005 IEEE Workshop on Information Assurance and Security United States Military Academy, West Point, NY.

R.A. Maxion and T.N. Townsend, "Masquerade Detection using Truncated Command Lines", In International Conference on Dependable Systems and Networks (DSN-02), pp. 219-228, Los Alamitos, CA, Jun. 23-26, 2002, IEEE Computer Society Press, Washington, D.C.

R.A. Maxion and T.N. Townsend, "Masquerade Detection Augmented with Error Analysis". IEEE Transactions on Reliability, 53(1): 124-147, Mar. 2004.

M. Schonlau, W. DuMouchel, W. Ju, A. Karr, M. Theus, Y. Vardi, (2001), "Computer Intrusion: Detecting Masquerades", Statistical Science, 2001;16(1):58-74.

R.A. Maxion, "Masquerade Detection Using Enriched Command Lines". In International Conference on Dependable Systems and Networks (DSN-03), pp. 5-14, Los Alamitos, CA Jun. 22-25, 2003. IEEE Computer Society Press. San Francisco, CA.

E.E. Eiland, and Lorie M. Liebrock, "An Application of Information Theory to Intrusion Detection", Proceedings of the $4^{th}$ IEEE International Workshop on Information Assurance, Royal Holloway, UK, Apr. 2006.

S.C. Evans, B. Barnett, G.J. Saulnier and S.F. Bush, "Minimum Description Length Principles for Detection and Classification of FTP Exploits," MILCOM 2004.

S.F. Bush and S.C. Evans, "Information Assurance Design and Assessment: Final Report", General Electric Research and Development Center, Aug. 2002.

S. Goel and Stephen F. Busch, Kolmogorov Complexity Estimates for Detection of Viruses in Biologically Inspired Security Systems: A Comparison with Traditional Approaches., Complexity, 9:2, pp. 54-73, 2003.

Benedetto, Caglioli and Loreto, "Language Trees and Zipping", Physical Review Letters, 88, 2002. Grunwald, et al. Advances in Minimum Description Length Theory and Applications. MIT Press, 2005.

C. de la Higuera, "A Bibliographical Study of Grammatical Inference", Pattern Recognition vol. 38, pp. 1332-1348, 2005.

S. C. Evans, G.J. Saulnier and S.F. Bush, "A New Universal Two Part Code for Estimation of String Kolomogorov Complexity and Algorithmic Minimum Sufficient Statistic," DIMACS Workshop on Complexity and Inference, 2003, http://www.stat.ucla.edu/-cocteau/dimacs/evans.pdf.

S.C. Evans, T.S. Markham, A. Torres, A. Kourtidis and D. Conlin, "An Improved Minimum Description length Learning Algorithm for Nucleotide Sequence Analysis," Proceedings of IEEE $40^{th}$ Asilomar Conference on Signals, Systems and Computers, Pacific Grove, CA, Nov. 2006.

S.C. Evans, A. Kourtidis, T.S. Markham, J. Miller, D. Conklin and A. Torres, "MicroRNA Target Detection and Analysis for Genes Related to Breast Cancer Using MDLcompress," EURASIP Jounal on Bioinformatics and Ssystems Biology, Special Issue on Information Theoretic Methods for Bioinformatics, Sep. 2007.

M. Latendresse, "Masquerade Detection via Customized Grammars", Lecture Notes in Computer Science, 3548: 141-159, Jun. 2005.

C.G. Nevill-Manning and I.H. Witten (1997), "Identifying Hierarchical Structure in Sequences in a Linear Time Algorithm," Journal of Artificial Intelligence Research, 7, 67-82.

C.G. Nevill-Manning and I.H. Witten, I.H.; "Compression and Explanation Using Hierarchical Grammars"; http://sequitur.info/, Dept of Computer Science, University of Waikato, Hamilton, New Zealand, May 22, 2007.

P. Gacs, J.T. Tromp and P. Vitanyi, "Algorithmic Statistics", IEEE Transactions on Information Theory, vol. 47, No. 6, Sep. 2001, pp. 2443-2463.

T.M. Cover and J.A. Thomas, Elements of Information Theory, Wiley, NY 1991.

M. Li and P. Vitanyi, "An Introduction to Kolmogorov Complexity and its Applications", Spring, NY 1997.

R. Richardson, CSI Survey 2007: The $12^{th}$ Annual Computer Crime and Security Survey. 2007, Computer Security Institute: San Francisco, CA.

2007 Threat Report, 2008 Threat and Tech. Forecast. 2008, Trend Micro, Inc.: Tokyo, Japan.

T. AbuHmed, A. Mohaisen and D. Nyang, "A Survey on Deep Packet Inspection for Intrusion Detection Systems"; Mar. 2008.

I. Zhang and G.B. White, "An Approach to Detect Executable Content for Anomaly Based Network Intrusion Detection", in $21^{st}$ Internat.1 Parallel and Distributed Processing Symp. 2007, IEEE. p. 424.

M.Z. Shafiq et al., Extended Thymus Action for Improving Response of AIS based NID System Against Malicious Traffic, in Congress on Evolutionary Computation, 2007. 2007, IEEE. p. 3369-3376.

J.M. Estevez-Tapiador, P. Garcia-Teodoro and J.E. Diaz-Verdejo, Measuring Normality in HTTP Traffic for Anomaly-based Intrusion Detection. Computer Networks, 2004.45(2):p. 18.

K.L. Ingham and A. Somayaji, A Methodology for Designing Accurate Anomaly Detection Systems, In Latin America Networking Conference, 2007, San Jose, CA ACM.

S. Evans et al., Minimum description length principles for detection and classification of FTP exploits, in Military Communications Conference, 2004, MILCOM 2004, IEEE. 2004.

P.D. Grunwald, "The Minimum Description Length Principle". 2007, Cambridge, MA: MIT Press. 703.

P. Adriaans and P. Vitanyi, The Power and perils of MDL. in IAIT 2207.2007.Nice, France.

G. Munz, S. Li and G. Carle, "Traffic Anomaly Detection Using k-means Clustering", in Leistungs, Zuverlässigkeitsund Verlässlichkeitsbewertung Kommunikationsnetzen und Verteilten Systemen, 4. Gl/itg-Wks. MMBne. 2007. Hamburg, Germany.

K. Wang and S.J. Stolfo, "Anomalous Payload-based Network Intrusion Detection, Recent Advances in Intrusion Detection SpringerLink", Editor. 2004, Springer:Berlin/Heidelberg, Germany. pp. 203-222.

N. Athanasiades et al. "Intrusion Detection Testing and Benchmarking Methodologies", in Proceedings of the First IEEE International Workshop on Info. Assurance. 2003, Los Alamitos, CA, IEEE.

Staff. MIT Lincoln Laboratory Information Systems Technology [Web site] 2008 [cited May 21, 2008]; Umbrella site for 1999 DARPA Intrusion Detection Evaluation Data Set]. Available from: http://www.ll.mit.edu/mission/communications/ist/corpora/ideval/data/1999data.html.

Staff. Tenable Network Security. [Web page] 2008 [cited May 21, 2008]; Home page for Nessus Vulnerability Tppl]. http://www.nessus.org/essus/.

J. Elson, tcpflow—TCP Flowrecorder. [Web page] Aug. 7, 2003 [cited May 22, 2008]; Available from: http://www.circlemud.org/~jelson/software/tcpflow/.

S. Wehner, Analyzing Worms and Network Traffic Using Compression, in arXiv:cs/0504045v1 [cs.CR] Apr. 12, 2005.

R. Duda, P.E. Hart and D.G. Stork, Pattern Classification ($2^{nd}$ Edition) John Wiley and Sons, 2001.

GE Research & Lockheed Martin Corporation; "MDLcompress for Intrusion Detection: Signature Inference and Masquerade Attack" Jun. 2007 IEEE.

Proceedings of the Fourth IEEE, Computer Science, "An Application of Information Theory to Intrusion Detection", E. Earl Eiland and Lorie M. Liebrock, Ph.D. Apr. 2006.

Proceedings of 2003 International, "Masquerade Detection Using Enriched Command Lines", Roy A. Maxion, Aug. 2003.

IEEE Transactions on Pattern Analysis and Machine Intelligence, vol. 21, No. 2 dated Feb. 1999, entitled, "Using Evolutionary Programming and Minimum Description Length Principle for Data Mining of Bayesian Networks", pp. 174-178.

Proceedings of the 28th Hawaii International Conference on System Sciences, 1995 IEEE, "Molecular Evolutionary Phylogenetic Trees Based on Minimum Description Length Principle", Fengrong Ren et al., pp. 165-173.

* cited by examiner

INTRUSION DETECTION USING MDL COMPRESSION

This application is a continuation of U.S. patent application Ser. No. 12/260,627, filed Oct. 29, 2008, the entire disclosure of which is hereby incorporated by reference.

Embodiments of the present invention relate generally to methods and systems for intrusion detection and, more specifically, to methods and systems for intrusion detection using minimum description length inferred grammars associated with data sets in an information system.

This application is directed to an invention(s) that was made as a result of activities undertaken within the scope of a Joint Research Agreement made between Lockheed Martin Corporation and the General Electric Company.

Malicious information system users seek to exploit the simplest means of gaining unauthorized access to an information system such as, for example, a network, while minimizing their risk of detection. Because hacking or gaining unauthorized access through system defenses is generally more detection-prone than acting in a legitimate manner, attackers often prefer to operate inside such barriers rather than breaking through them. For example, by masquerading as a legitimate user, an attacker can avoid having to forcefully penetrate the target system. Also, using another user's account can mislead system administrators, thereby providing an attacker a layer of protection against exposure.

Thus, detecting a masquerade is an important capability for defending an information system against intrusion. Detecting a masquerade may primarily depend on stochastic analysis in which the likelihood of any particular event being a masquerade is determined by comparing a users' current activity to a pre-established profile. Unfortunately, user activity can vary considerably, even during one session, and is likely to evolve over time. Evolution can be addressed by periodic recalibration. Variance over the short term, however, can be problematic for reliable detection. User activity metrics can have such wide distributions that legitimate and masquerade activity may have significant overlap. In such situations, there may be no threshold that will provide error-free masquerade detection; at best, a threshold can be set to minimize cost/risk to the protected system.

According to various embodiments, then, a grammar-inference algorithm can be used to model legitimate activity, with the resulting grammar then being used to detect masquerades. In particular, various embodiments can comprise a system and method that use and apply a minimum description length (MDL) compression algorithm to detect masquerades.

DETAILED DESCRIPTION

Embodiments relate generally to an intrusion detection system and method. In particular, embodiments can provide an intrusion detection system and method for detecting masquerade intrusion attacks using a grammar inference engine configured to execute a grammar inference algorithm that uses Minimum Description Length principles from the theory of Kolmogorov Complexity and Algorithmic Information Theory to infer a grammar. In various embodiments, the grammar inference algorithm can find patterns and motifs useful for compressing unknown data sets. In at least one embodiment, a grammar-based Minimum Description Length (MDL) compression algorithm can be used to determine a masquerade attack.

Limiting factors for intrusion detection systems include the associated error rate, in particular the false alarm rate, the demand for computational resources, and the execution time required. Although a single undetected intrusion can cause significant cost, false alarms require constant manual screening, thus generating a continual drain on personnel resources. Also, the occurrence of many false alarms reduces manual screening effectiveness, further aggravating the problem. Thus, embodiments can include compression-based masquerade intrusion detection systems and methods having an acceptable false alarm rate and relatively low computational intensity to allow for execution in linear time, with respect to conventional approaches to intrusion detection. In particular, embodiments can comprise a grammar based compressor or compression algorithm that uses a grammar based coding technique that compresses through inferring an algorithmic minimum sufficient statistic in a stochastic gradient manner, and that applies grammars such that detection can be determined in linear time.

Figure 1:
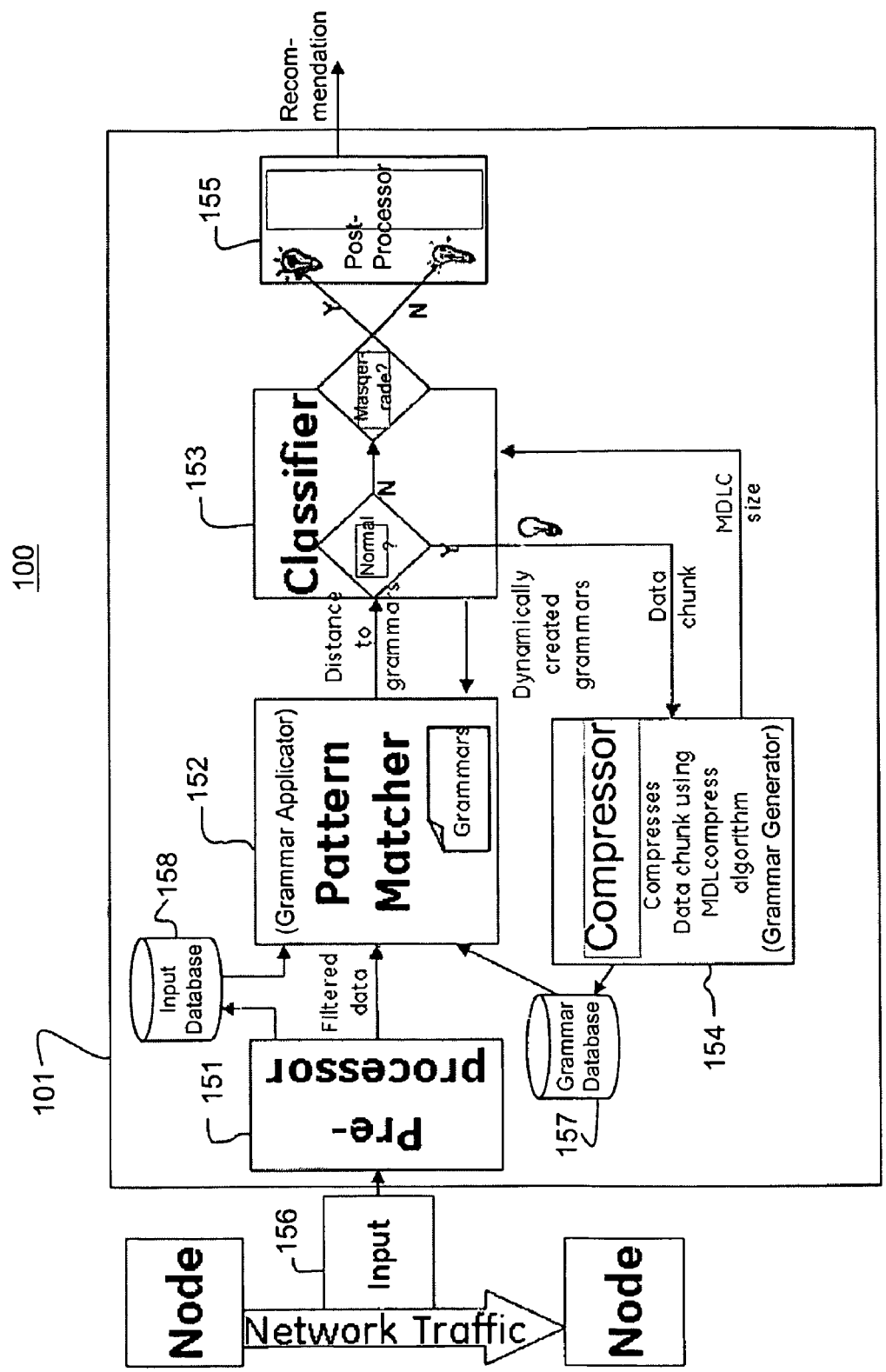
FIG. 1 is an intrusion detection system according to various embodiments.

With respect to FIG. 1, there is shown an intrusion masquerade detection system 100 according to various embodiments. As shown in FIG. 1, the intrusion masquerade detection system 100 can comprise a grammar inference engine 101 configured for intrusion masquerade detection and including a pre-processor 151 coupled to a grammar applicator (pattern matcher) 152, a classifier 153 coupled to the grammar applicator 152, and to a grammar generator or compressor 154. According to various embodiments, the pre-processor 151 can be configured to receive input data 156, which can be an input data stream, and be configured to output filtered data to the grammar applicator 152. The grammar applicator 152 can be configured to apply grammars produced using a compression algorithm to the filtered or processed input data received from the pre-processor 151. The grammar generator 154 can be coupled to the classifier 153 and configured to generate grammars using the compression algorithm. In various embodiments, the grammar applicator 152 and grammar generator 154 can perform the same compression algorithm. Furthermore, in various embodiments, the grammar applicator 154 can calculate compression data by applying a grammar-based compression algorithm to a portion of the input data 156 associated with a particular user, as described herein.

In various embodiments, the classifier 153 can be coupled to the grammar applicator 152, the grammar generator 154, and to a post-processor 155. The classifier 153 can compare grammars generated or identified by the grammar applicator 152 and compare the calculated compression data with one or more pre-defined models of grammar-based compression data associated with the user. In particular, the classifier 153 can be configured to determine a likelihood of fit between each portion of the input data 156 and the models based on a threshold comparison provided by the grammar applicator 152. In this regard, the classifier 153 can receive threshold values from the grammar applicator 152 and decision criteria from the post-processor 155. Furthermore, the classifier 153 can send a grammar generation request to the grammar generator 154 and, optionally, can send dynamically generated grammars to the grammar applicator 152. In addition, the post-processor 155 may assign each of the sequential portions of the input data stream 156 to one of the models. The post-processor 155 can also be configured to output a recommendation as to whether the input data 156 has been classified as a masquerade intrusion or attack, thus detecting an attack on the network, or if normal behavior is determined, e.g., a healthy session. Further, the post-processor 155 can also output an indication of the assigned model. In various embodiments, the classifier 155 in evaluating a particular input data stream can also take into consideration relevant information from one or more other input data streams.

According to various embodiments, the grammar inference engine 101 can further include a grammar database 157 operatively coupled to the grammar applicator 152 and the grammar generator 154. The grammar database 157 can include compression models such as, for example, health signature models and fault signature models formed using compressed data sets from application of a compression algorithm. The health signature models can include models associated with known healthy or normal session activity or behavior, and the fault signature models can include models associated with known attacks, including masquerades, or other malicious or unauthorized activities. In various embodiments, the grammar applicator 152 can be configured to apply one or more of the compression models to the processed or filtered input data received from the pre-processor 151.

The grammar inference engine 101 can also include an input database 158 operatively coupled to the output of the pre-processor 151 and the input of the grammar applicator 152. In various embodiments, the input database 158 can store input data that is processed or filtered by the pre-processor 151. The grammar applicator 152 can then retrieve or obtain the filtered input data from the input database 158 independently of the data rate of the input data stream 156.

The pre-processor 151 can also be configured to apply a sliding window protocol to the input data/stream that segments or divides the input data stream into discrete or separate portions of sequential information. Input data streams of various lengths can be supported such as, for example, input data streams of at least 1 KB in length. In various embodiments, the pre-processor 151 can filter the input data stream 156 by removing from consideration input data known to not be useful for harboring or supporting network attacks such as, for example, but not limited to, timestamp data.

In various embodiments, the input data stream can be received from an information system. For example, the information system can be a communication network such as, for example, an intranet or the Internet. In such embodiments, the input data stream can comprise packetized digital information such as, for example, digital information provided in accordance with the Transport Control Protocol/Internet Protocol (TCP/IP), the HyperText Transport Protocol (HTTP), the Simple Mail Transport Protocol (SMTP), or the Uniform Datagram Protocol (UDP). However, the intrusion masquerade detection system 100 can be used for intrusion masquerade detection by intercepting or monitoring an information path between any two or more nodes of any communication system or, further, between any two or more nodes of a network or a distributed computing system, according to any protocol which could be used for masquerade activity. In such embodiments, the input data stream 156 can be a sequential data stream. The information path can be an information path that is inside a firewall, and therefore associated with one or more trusted users of the information system.

In various embodiments, the grammar inference engine 101 can use a compression algorithm for classification of input data. For example, according to various embodiments, the grammar applicator 152 and grammar generator 154 can be configured to perform a Minimum Description Length (MDL) Compression (MDLC) algorithm to generate grammars. As used herein, the term "grammars" refers to a set of rules and relationships that are associated with particular data sequences. Furthermore, the term "model" or "compression model" as used herein refers to a set of one or more grammars with a probability distribution being associated with each grammar. For example, the grammar applicator 152 can take the MDLC-identified grammars and apply them to an unclassified input stream, and then calculate the unknown data's distance from the known data classes, as represented by their models. The distance values can then be passed on to the classifier 153.

Accordingly, in various embodiments, the grammar inference engine 101 can be configured to execute a grammar inference algorithm that is based on Minimum Description Length (MDL) principles and the theory of Kolmogorov Complexity and Algorithmic Information Theory to infer a grammar, finding patterns and motifs that aid most in compressing unknown data sets. In particular, the grammar inference engine can use such an algorithm to infer grammars and then apply those grammars to identify masquerades or other difficult to detect intrusion attacks. In addition, in various embodiments, the grammar inference engine 101 can be configured to detect anomalous, hostile, or other attack events in linear time. Further information regarding MDL principles is provided in Grunwald, P. D., "The minimum description length principle," 2007, Cambridge, Mass., MIT Press. 703, and Adriaans, P. and P. Vitanyi, "The Power and Perils of MDL," in IAIT 2007, Nice, France, both of which are hereby incorporated by reference.

For example, in various embodiments, the grammar inference engine 101 can include a grammar based compressor or be configured to perform a compression algorithm that uses a grammar based coding technique that compresses through inferring an algorithmic minimum sufficient statistic in a stochastic gradient manner, referred to herein as MDL compression. An example of such an algorithm is described in Evans, S. C., Markham, T. S., Torres, A., Kourtidis, A. and Conklin, D., "An Improved Minimum Description Length Learning Algorithm for Nucleotide Sequence Analysis," Proceedings of IEEE 40th Asilomar Conference on Signals, Systems and Computers, Pacific Grove, Calif., November 2006, which is hereby incorporated by reference.

According to various embodiments, the grammar inference engine 101 can provide grammar inference using the MDL compression algorithm in accordance with Minimum Description Length (MDL) principles that provide the capability for optimizing data analysis without over fitting. Further description of MDL principles is available from, for example, Benedetto, Caglioli and Loreto, "Language Trees and Zipping", Physical Review Letters, 88, 2002, and Grünwald, et al., "Advances in Minimum Description Length:

Theory and Applications," MIT Press, 2005, which is hereby incorporated by reference. MDL is related to Kolmogorov Complexity, a measure of descriptive complexity contained in an object, which refers to the minimum length of a program such that a universal computer can generate a specific sequence. Further information regarding Kolmogorov Complexity can be found in, for example, Cover, T. M. and Thomas, J. A., "Elements of Information Theory," Wiley, NY, 1991, and Li, M. and Vitányi, P., "An Introduction to Kolmogorov Complexity and Its Applications," Springer, N.Y. 1997, which are hereby incorporated by reference. For example, Kolmogorov Complexity can be described as follows, where j represents a universal computer, p represents a program, and x represents a string:

$$K_\varphi(x) = \left\{ \min_{\varphi(p)=x} l(p) \right\} \quad \text{Eq. 1}$$

The conditional Kolmogorov Complexity K(y|x) of a string y given string x as input can be described as:

$$K_\varphi(y \mid x) = \left\{ \begin{array}{l} \min_{\varphi(p,x)=y} l(p) \\ \infty, \text{ if there is no } p \text{ such that } \varphi(p, x) = y \end{array} \right\}, \quad \text{Eq. 2}$$

where l(p) represents program length to and j is a particular universal computer. Thus, knowledge or input of a string x may reduce the complexity or program size necessary to produce a new string y. An MDL decomposition of a binary string x considering finite set models is given by:

$$K_\varphi(x) \stackrel{+}{=} \{K(S) + \log_2 |S|\}, \quad \text{Eq. 3}$$

where $K_\varphi(x)$ is the Kolmogorov Complexity for string x on universal computer $\varphi$ and S represents a finite set of which x is a typical or equally likely element. The minimum possible sum of descriptive cost for set S (the model cost encompassing all regularity in the string) and the log of the sets cardinality (the required cost to enumerate the equally likely set elements) can correspond to an MDL two part description for string x. By considering the model cost, as well as the data costs of a string, MDL theory can provide a formal methodology for introducing priors or assumptions into model inference. Furthermore, the size of the model (for example, the number of bits allocated to defining the members of set S) can be related to the Kolmogorov Structure Function, h (see Li, M. and Vitányi, P., "An Introduction to Kolmogorov Complexity and Its Applications," Springer, N.Y. 1997), where h defines the smallest set, S, that can be described in at most k bits and contains a given string x of length n:

$$h_k(x^n \mid n) = \min_{p:l(p)<k,\mu(p,n)=S} \{\log_2 |S|\} \quad \text{Eq. 4}$$

Further details regarding MDL decomposition can also be found in Gacs, P., Tromp, J. T., and Vitanyi, P. "Algorithmic Statistics", IEEE Transactions on Information Theory, Vol 47, No. 6, September 2001, pp. 2443-2463, and Cover, T. M. and Thomas, J. A., "Elements of Information Theory," Wiley, NY, 1991, which are hereby incorporated by reference.

Figure 2:
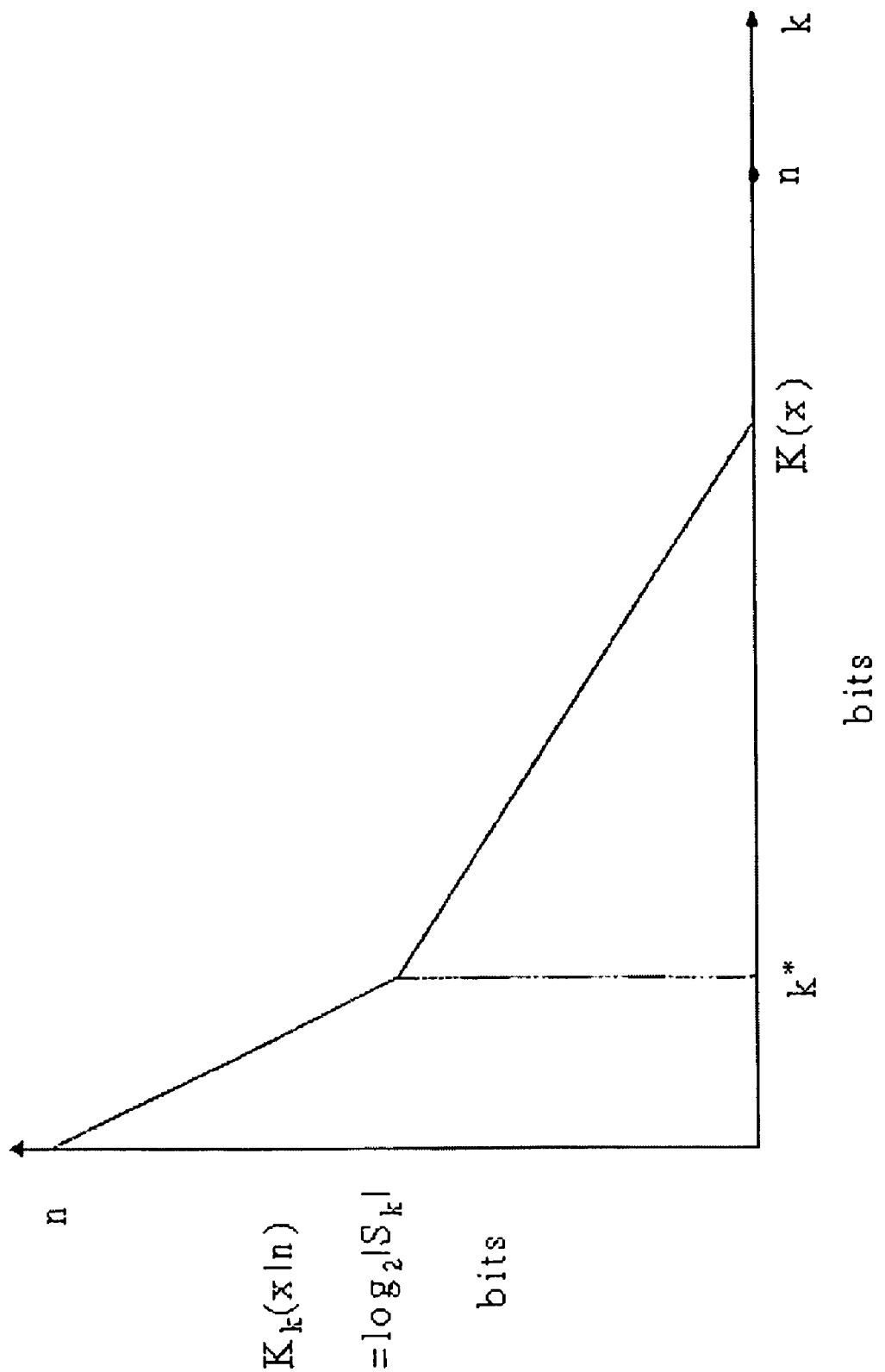
FIG. 2 illustrates a Kolmogorov structure function in accordance with various embodiments.

The function of Eq. 4 above can be used to provide a minimum sufficient statistic for use with MDL. Further details are available, for example, in Cover, T. M. and Thomas, J. A., "Elements of Information Theory," Wiley, NY, 1991. In particular, FIG. 2 illustrates a Kolmogorov structure function in accordance with various embodiments. Referring to FIG. 2, it is shown that the cardinality of the set containing string x of length n can start out as equal to n when k=0 bits are used to describe set S, for example, to restrict its size. As k increases, the cardinality of the set containing string x can be reduced until a critical value k* is reached which is referred to as the Kolmogorov Minimum Sufficient Statistic, or Algorithmic Minimum Sufficient Statistic. In various embodiments, increasing k beyond k* will continue to make possible a two-part code of size $K_\varphi(x)$, eventually resulting in a description of a set containing the single element x. Thus, as model size (k) increases, the size of the smallest typical set (n) that includes string x decreases. The increase in the descriptive cost of the model or set, however, while reducing the cardinality of the set to which x belongs, does not decrease the overall descriptive cost.

Figure 3:
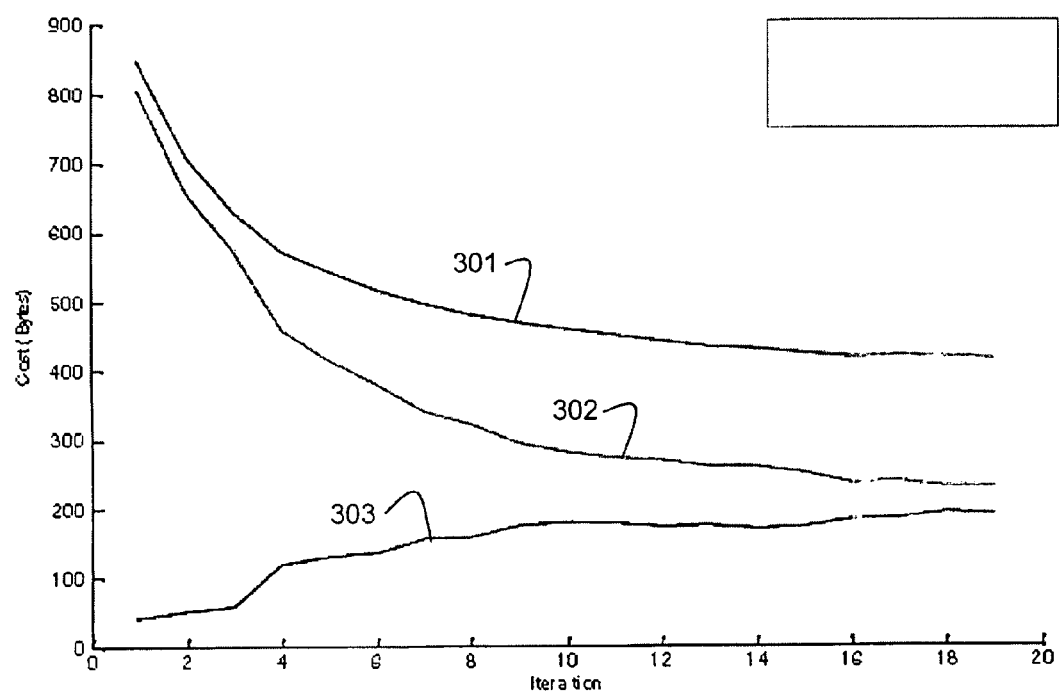
FIG. 3 illustrates costs associated with a compression method according to various embodiments as applied to an example set of input data associated with a user.

While various algorithms have been proposed (see, for example, Evans, S. C., Saulnier, G. J. and Bush, S. F., "A New Universal Two Part Code for Estimation of String Kolmogorov Complexity and Algorithmic Minimum Sufficient Statistic," DIMACS Workshop on Complexity and inference, 2003), the MDL compression method according to various embodiments can provide deep recursion characteristics having advantageous speed and memory use characteristics. For example, without limitation, embodiments can gather phrase statistics in a single pass and perform subsequent selection of multiple codebook phrases with minimal computation. Further details regarding MDL compression are available in, for example, Evans, S. C., Kourtidis, A., Markham, T. S, Miller, J., Conklin, D. and Tones, A. "MicroRNA Target Detection and Analysis for Genes Related to Breast Cancer Using DLcompress," EURAS P Journal on Bioinformatics and Systems Biology, Special Issue on Information Theoretic Methods for Bioinformatics. September 2007, which is hereby incorporated by reference. For example, according to various embodiments, the MDL compression method can automatically terminate when remaining grammar candidates no longer contribute (for example, the total cost in terms of bytes stops decreasing with each successive iteration), which provides the capability to identify strings of significant sequences for MDL while bounding the amount of computational resources required. This characteristic can be important for masquerade detection because different users may have very similar grammars, making them difficult to differentiate. In this regard, FIG. 3 illustrates a total cost 301 (and its component costs) in terms of bytes versus iterations of the MDL compression algorithm applied to an example set of input data associated with a user. Referring to FIG. 3, the example set of input data shown therein is taken from Schonlau, M., DuMouchel, W., Ju, W., Karr, A., Thetis, M., Vardi, Y. (2001), "Computer Intrusion: Detecting Masquerades," Statistical Science, 2001; 16(1):58-74, which is hereby incorporated by reference. As shown in FIG. 3, the total cost 301 can include a grammar cost 302 and a compression model cost 303. In various embodiments, the grammar cost 302 can be a cost in the size of the grammar expressions used to model the data set in bits, for example, Furthermore, the compression model cost 303 can be a cost of the size of the model comprising the compression model for a user data set in bits, for example.

Thus, as discussed above, the MDL compression method according to various embodiments can form an estimate of the algorithmic minimum sufficient statistic and use this estimate to calculate the similarity (or its inverse, distance) between two data populations. This ability naturally flows from the Kolmogorov Complexity of a String y given string x:

$$K_\varphi(y \mid x) = \begin{cases} \min_{\varphi(p,x)=y} l(p) \\ \infty, \text{ if there is no } p \text{ such that } \varphi(p, x) = y \end{cases} \quad \text{Eq. 5}$$

Figure 4:
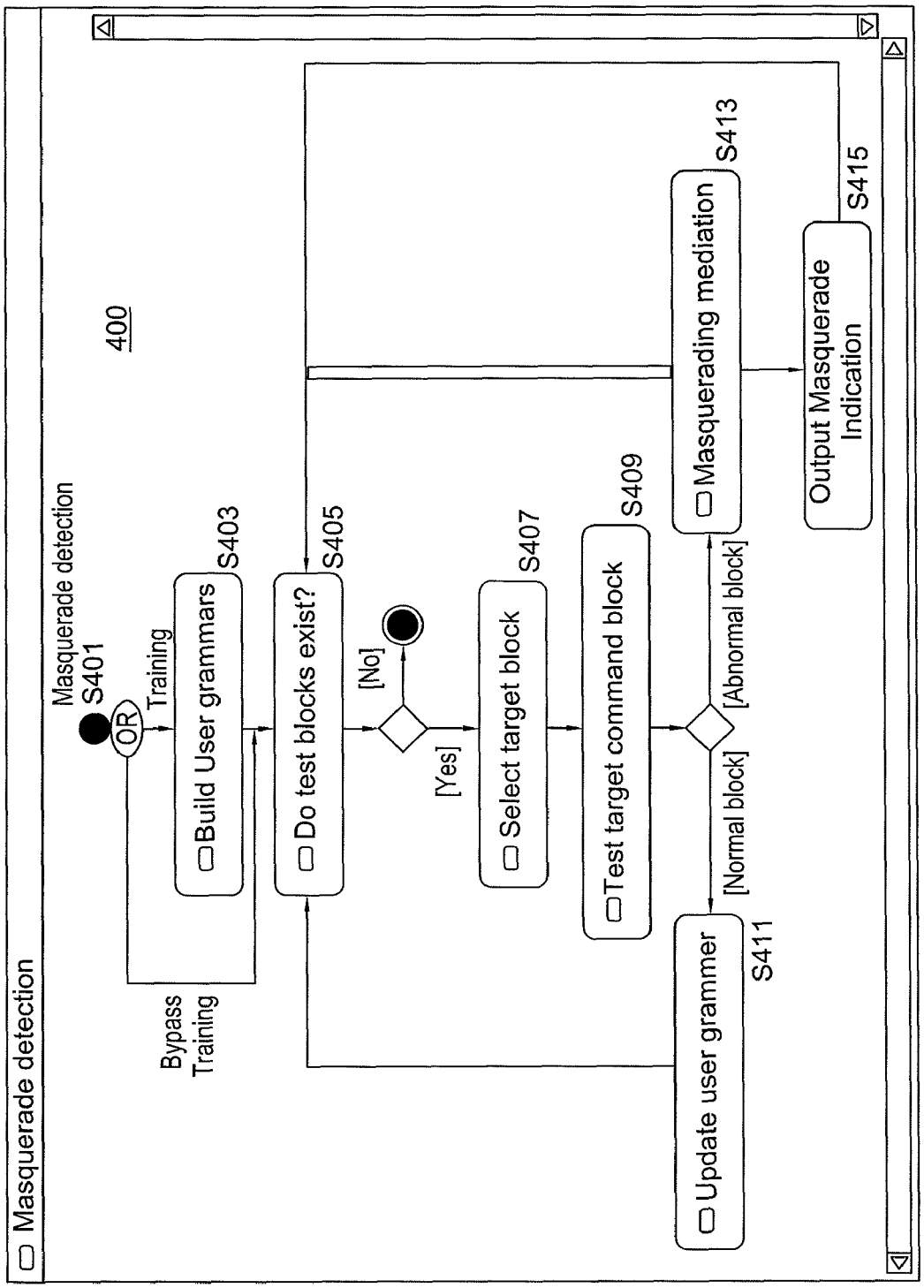
FIG. 4 is a flow chart of a masquerade detection method that uses MDL compression according to various embodiments.

In particular, according to various embodiments, the MDL compression method can include a grammar inference process configured for detecting masquerades. For example, with respect to FIG. 4, there is shown a flow chart of a masquerade detection method 400 that uses MDL compression. As shown in FIG. 4, the masquerade detection method 400 can commence at S401 to receive user data. The user data can be monitored from a source of live user data such as a network, or the user data can be stored and retrieved using a memory device or database. In at least one embodiment, the user data can be segmented into strings for further processing. User data can also include training data for use in building grammar-based models for comparison to live data. If training or building of user grammars is to be performed, the method can proceed to S403. If training or building of user grammars is not to be performed, then the method 400 can proceed to S405 to begin testing of input data.

At S403, the method 400 can proceed to build user grammars by, for example, applying the MDL compression algorithm to the user data. One or more grammars can be built for each user. In various embodiments, the MDL compression process can summarize key characteristics of the data (for example, the "big ideas" of the data), which are used to form a model by placing the characteristics into a model (e.g., grammar) portion of a two-part code. The code can be interpreted as an estimate of the Kolmogorov Minimum Sufficient Statistic, an Algorithmic Statistic, as discussed above, which summarizes the user data. In various embodiments, the method 400 can build this estimate one phrase at a time in a steepest descent approach. Furthermore, the MDL compression algorithm can be applied to the user data until model costs increase and data costs decrease, as shown in FIG. 3, until no further reduction in total cost can be achieved, at which time the algorithm can terminate. According to various embodiments, this step S403 can be performed at discrete or dedicated training times. Furthermore, for training data input, building the user grammars at S403 can also include producing a set of MDL compression grammar rules based on the training data. For example, Table 1 below shows a set of MDL compression grammar rules produced from exemplary Schonlau training data.

TABLE 1

| Grammar Rule | Frequency |
|---|---|
| $S_1 \to <>$netscape | 186 |
| $S_2 \to S_1 S_1/n$ | 86 |
| $S_4 \to$ /ncat/nmail/ncsh | 7 |
| $S_5 \to S_2 S_1/n$ | 12 |
| $S_6 \to$ /nlaunchef | 20 |
| $S_7 \to S_6$/nsh | 30 |
| $S_8 \to S_6 S_6 S_7$ | 18 |

As can be seen from Table 1, the MDL compression grammar rules can build on each other to produce long rules from smaller elements. The frequency entries in Table 1 can be useful in generating probability distributions for the grammars for use in a model.

In various embodiments, the step S403 is optional. That is, the method 400 can perform masquerade detection without training or using pre-built grammars.

Referring again to FIG. 4, at S405, the method 400 can proceed to conduct real-time processing to detect masquerades for real user data if test blocks exist. If no test blocks (for example, grammar-based models) exist, then the method can return to S401 to commence processing and build user grammars at S403. If test blocks exist, then the method can proceed to S407 to select a window of input data, which may include one or more target command blocks, for testing. In at least one embodiment, selection of the user data to be tested can be received from an operator via a human-machine interface.

The method can then proceed to S409 to test a target command block associated with the user data. According to various embodiments, testing a target command block at S409 can include, in a real time process, searching a string y of input data for MDL compression phrases from a user model x and substituting with Huffman code for the phrase; sorting the grammar so that longest phrases are applied first to an unclassified string y; and, attributing a cost for phrases that are not found in the model by quantifying the cost of explicitly representing the particular symbols. For example, given two target blocks, y and y', the "fit" of both blocks with user x's model can be determined by using x's model to create non-dictionary segments for y and y'. Since the model is common to both y and y', it can be ignored. The degree of target blocks match, then, is indicated by the length of the blocks non-dictionary segment relative to the length of the uncompressed block. In various embodiments, this can be measured using an inverse compression ratio (ICR):

$$ICR = \frac{|\text{block\_non-dictionary\_segment}|}{|\text{original\_block}|} \quad \text{Eq. 6}$$

After computing the ICR, the compression ratio (or inverse compression ratio) for y is compared with preestablished upper and lower thresholds for user x. If the computed ICR falls within the upper and lower thresholds, a normal block of data is determined and the method can proceed to S411 to update the user grammar model with the newly-determined normal block, and to return to S405 for further processing. In various embodiments, step S411 is optional. If the computed ICR falls outside of either the upper or lower threshold, an abnormal block of data is determined and the method can proceed to S413 for masquerading mediation and for outputting of a masquerade indication at S415. In various embodiments, masquerading mediation can include taking or causing actions to negate or limit the damage or exposure associated with a masquerade such as, for example, disabling a communication port associated with a masquerading user. According to various embodiments, the output masquerade indication can be an alarm output provided to a user via a display, illumination of a Light Emitting Diode (LED), hardcopy printout, transmission of an alarm or alerting message to a communications device, computing device, or telecommunications terminal, or other audible or visual alarms.

According to various embodiments, the steps S405 through S415 can be repeated as required for continued masquerade detection. Furthermore, step S403 can be repeated to build additional user grammars.

Figure 5:
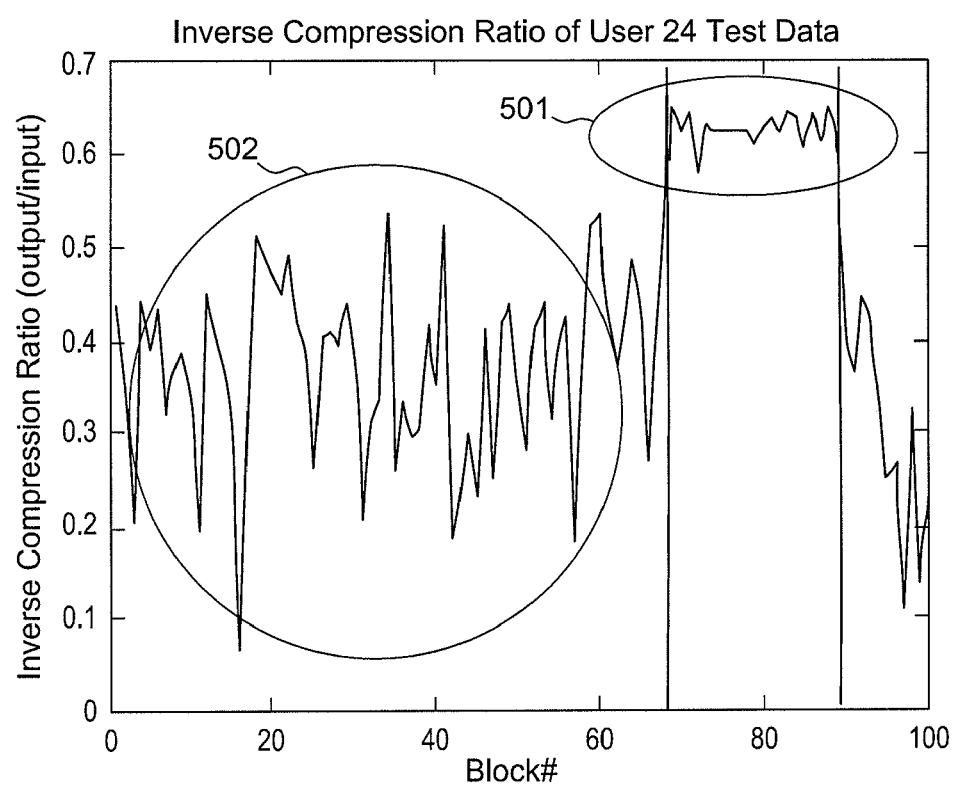
FIG. 5 shows an exemplary output masquerade indication 500 according to at least one embodiment.
Figure 6:
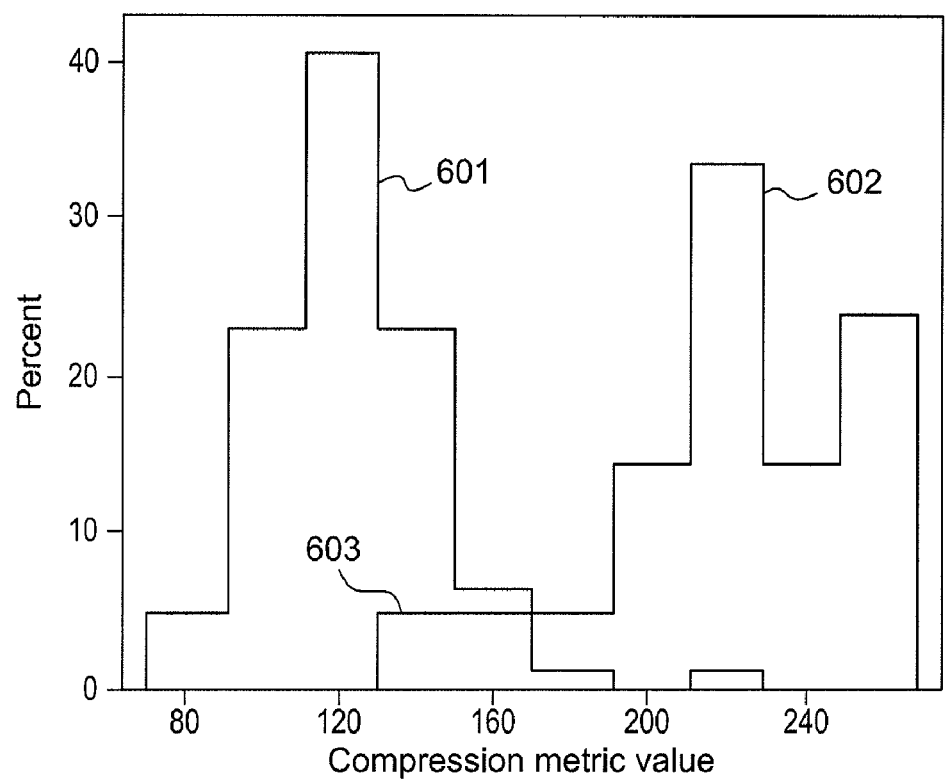
FIG. 6 is a chart illustrating a distribution of a compression metric according to conventional detection methods.
Figure 7:
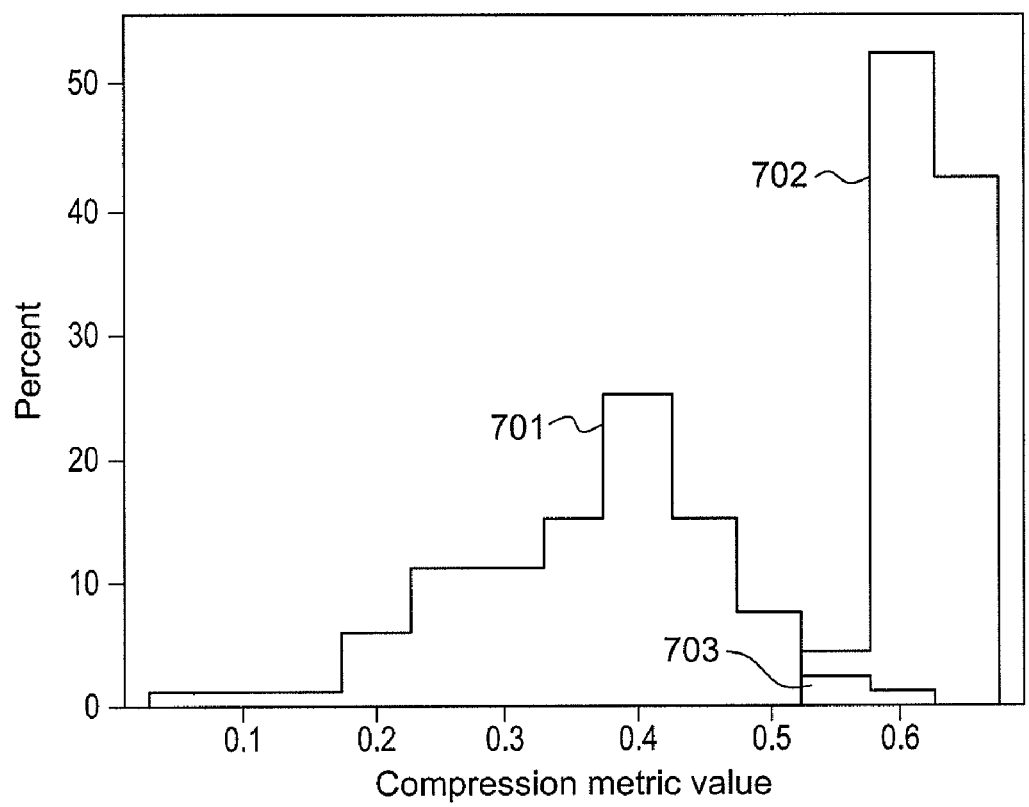
FIG. 7 is a chart illustrating a distribution of a compression metric according to at least one embodiment using the MDL compression algorithm.

For example, FIG. 5 shows an exemplary output masquerade indication 500 according to at least one embodiment. Referring to FIG. 5, the region 501 between the vertical dotted lines illustrates a masquerade. It is noted that in this example, the user's normal traffic 502 is seen to have a highly variable ICR. However, even with this degree of normal traffic variability, the masquerade region 501 is noticeably different by being clearly out-of-band with respect to the normal traffic 502, and thus the masquerade is easily detected. This is advantageous because ambiguous partitioning can cause classification errors. For example, with respect to FIG. 6, there is shown a distribution of a compression metric in accordance with a conventional method such as, for example, Schonlau's method. Referring to FIG. 6, it can be seen that the normal threshold distribution 601 and the masquerade threshold 602 can overlap in an overlap area 603 for such conventional methods. The overlap 603 can cause the same metric values to be mapped to more than one partition, resulting in ambiguity in the masquerade detection. In contrast, FIG. 7 shows a distribution of a compression metric according to at least one embodiment using the MDL compression algorithm. Referring to FIG. 7, it can be seen that the normal threshold distribution 701 and the masquerade threshold 702 have much reduced overlap in an overlap area 703 in comparison with the overlap 603 for conventional methods shown in FIG. 7, resulting in much reduced ambiguity in the masquerade detection. That is, the overlap 603 between legitimate and masquerade activity is much wider for the conventional method shown in FIG. 6, than for embodiments of the present invention as shown, for example, in FIG. 7. Furthermore, in various embodiments, the overlap 703 can be an artifact caused by the binning ranges selected or other quantization error and not due to the MDL compression algorithm or method.

In various embodiments, the intrusion masquerade detection method can include applying a receiver operating characteristic (ROC) analytical protocol to evaluate the masquerade detection results. The ROC may be well-suited for this purpose in that it is insensitive to data set variations, and so can facilitate comparisons in situations such as applying a conventional method, such as, for example, Schonlau's data set, where the ratio of malicious to normal activity varies considerably, and the MDL compression algorithm described herein.

According to various embodiments, organization of the MDL compression grammar for application to foreign strings (for example, strings other than the superset from which the training data was extracted) can affect masquerade detection results. Tables 2 and 3 below list three example grammar generation algorithms and two example grammar organizations which can be used in various embodiments.

TABLE 2

Grammar Phrase Detection Algorithms.

| | |
|---|---|
| Total cost (TC) | Each phrase is selected for its maximum compression of the target string. |
| Symbol compression ratio (SCR) | Each phrase is selecfed for it maximum reduction of the data portion of the compressed string |
| Maximum length (LM) | Phrases are selected based on their length, regardless of relative impact on string compression. |

TABLE 3

Grammar Organization Algorithms.

| | |
|---|---|
| Discovery order | Grammars are applied in the order discovered. |
| Decreasing order of phrase length (ML) | Grammars are organized such that the longest phrases are applied first. Ties remain in discovery order. |

Once a compression model has been built as described above with respect to FIG. 4, the intrusion masquerade detection method according to various embodiments can be consequently re-applied to input data sets in linear time with a small constant, which is advantageous compared to conventional compression methods that are compute-intensive and thus require a relatively long time to apply. Therefore, embodiments can perform intrusion masquerade detection in real-time.

It will be appreciated that the modules, processes, systems, and sections described above can be implemented in hardware, software, or both. For example, the grammar inference engine 101 can be implemented, for example, using a processor configured to execute a sequence of programmed instructions. The processor can be for example, but not limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as C++. The instructions can also comprise code and data objects provided in accordance with, for example, the Visual Basic™ language, or another object-oriented programming language. The sequence of programmed instructions and data associated therewith can be stored in a computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor. Also, the processes, modules, and sub-modules described in the various figures of and for the embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hardwired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any process capable of implementing the functions or steps described herein can be used to implement embodiments of the method, system, or a computer program product (software program).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the mechanical and/or computer programming arts.

Moreover, embodiments of the disclosed method, system, and computer program product can be implemented in software executed on a programmed general purpose computer, a special purpose computer, a microprocessor, or the like.

In various embodiments, the grammar database 157 and the input database 158 can be implemented using any commercial database or database management system such as, for example, Oracle Database 11 g available from Oracle Corporation of Redwood Shores, Calif.

Figure 8:
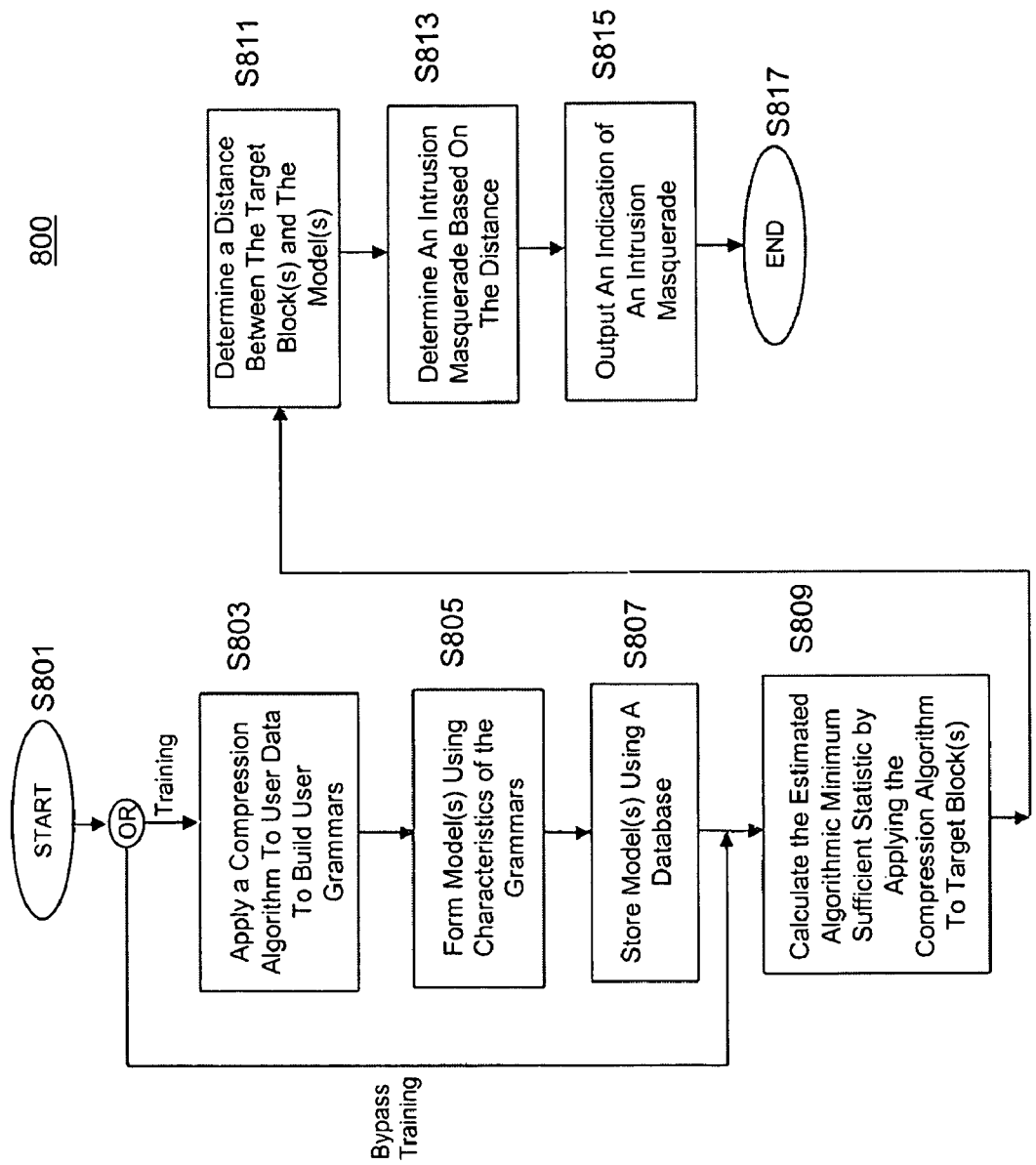
FIG. 8 is a flow chart of an intrusion masquerade detection method according to various embodiments.

With regard to FIG. 8, there is shown an intrusion masquerade detection method 800 according to various embodiments. Referring to FIG. 8, an intrusion masquerade detection method 800 can commence at S801. If training or building of user grammars is to be performed, control can proceed to S803. If training or building of user grammars is not to be performed, then the method 800 can proceed to S809 to begin performing masquerade detection. At S803, the method 800 can include applying a compression algorithm to user data to build user grammars. The compression algorithm can be, for example, the MDL compression algorithm as described herein. The method can then proceed to S805 to form at least one model using characteristics of the user grammars. The characteristics can include an estimated algorithmic minimum sufficient statistic. The method can then proceed to S807 at which the model can be stored using a database. The method can then proceed to S809 to calculate the estimated algorithmic minimum sufficient statistic by applying the compression algorithm to at least one target block. The method can then proceed to S811 to determine a distance between the at least one target block and the model. The method can then proceed to S813 to determine an intrusion masquerade based on the distance. The method can then proceed to S815 output an indication of an intrusion masquerade, following which the method can end at S817.

According to various embodiments, the steps S809 through S815 can be repeated as required for continued masquerade detection. Furthermore, steps S803 through S807 can be repeated to build additional user grammars. However, in various embodiments, the step steps S803 through S807 can be optional. That is, the method 800 can perform masquerade detection without training or using pre-built grammars.

It is, therefore, apparent that there is provided, in accordance with the various embodiments disclosed herein, an intrusion masquerade detection system and method that includes a grammar inference engine. A grammar-based Minimum Description Length (MDL) compression algorithm is used to determine a masquerade based on a comparison of compression results to one or more thresholds.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the appended claims.

What is claimed is:

1. An intrusion masquerade detection method, comprising:
   a computer applying a compression algorithm to user data to build user grammars associated with a user;
   forming at least one model by storing the user grammars in a database;
   applying the compression algorithm to at least one target block to calculate an estimated algorithmic minimum sufficient statistic;
   searching a string of data from the at least one target block for phrases matching user grammars contained in the at least one model;
   sorting the user grammars so that longest phrases among the user grammars are applied first to an unclassified string;
   converting each matching phrase to a variable-length code value by replacing each matching phrase with a corresponding variable-length code value;
   attributing a cost for phrases that are not found in the at least one model by quantifying a cost of explicitly representing symbols associated with those phrases;
   determining a degree of fit between the at least one target block and the at least one model based on the cost; and
   detecting an intrusion masquerade based on the degree of fit.

2. The intrusion detection method of claim 1, wherein the searching is performed in real-time.

3. The intrusion detection method of claim 1,
   wherein said the variable-length code is a Huffman code, and
   the compression algorithm is a grammar-based compression algorithm that estimates Kolmogorov complexity and that forms compressive grammar based on Minimum Description Length (MDL) principles.

4. The intrusion detection method of claim 1,
   wherein the forming the at least one model is performed using a steepest descent method, and
   the at least one model comprises a healthy session model.

5. The intrusion detection method of claim 1, further comprising:
   outputting an indication of an intrusion masquerade.

6. The intrusion detection method of claim 1,
   wherein the detecting the intrusion masquerade includes calculating an inverse compression ratio over a time period for user data, and comparing the calculated inverse compression ratio to at least one inverse compression ratio associated with a compressed data set of the at least one model, and
   the detecting the intrusion masquerade is based on a difference between the calculated inverse compression ratio and the inverse compression ratio associated with the compressed data set, the difference exceeding a threshold.

7. A machine-implemented grammar inference engine for intrusion detection, comprising:
- a pre-processor apparatus that receives input data and outputs filtered data;
- a grammar generator apparatus coupled to the pre-processor apparatus and configured to generate grammars associated with a user by applying a compression algorithm to the filtered data, to form at least one model by storing the user grammars in a database, and to apply the compression algorithm to at least one target block to calculate an estimated algorithmic minimum sufficient statistic;
- a grammar applicator apparatus that searches a string of data from the at least one target block for phrases matching user grammars contained in the at least one model, sorts the user grammars so that longest phrases among the user grammars are applied first to an unclassified string, replaces each matching phrase with a variable-length code value, and attributes a cost for phrases that are not found in the at least one model by quantifying a cost of explicitly representing symbols associated with those phrases; and
- a classifier apparatus coupled to the grammar applicator apparatus and to a post-processor apparatus, the classifier apparatus receiving the cost from the grammar applicator apparatus and decision criteria from the post-processor apparatus, the classifier apparatus being configured to determine a degree of fit between the at least one target block and the at least one model based on the cost and the decision criteria, to detect an intrusion masquerade based on the degree of fit, and to output an indication of the detected intrusion masquerade,
- wherein the post-processor apparatus assigns each portion of the input data to one of the models.

8. The grammar inference engine of claim 7, further comprising:
- a grammar database coupled to the grammar applicator apparatus and to the grammar generator apparatus; and
- an input database coupled to an output of the pre-processor apparatus,
- wherein the grammar applicator apparatus is configured to receive filtered data processed by the pre-processor apparatus from the input database.

9. The grammar inference engine of claim 7, wherein the compression algorithm is a grammar-based compression algorithm that estimates Kolmogorov complexity and that forms compressive grammar based on Minimum Description Length (MDL) principles.

10. The grammar inference engine of claim 7, wherein the pre-processor is further configured to apply a sliding window protocol to segment portions of the input data.

11. A non-transitory machine-readable medium upon which is embodied and stored a sequence of programmable instructions which, when executed by a processor, cause the processor to perform intrusion masquerade detection operations, comprising:
- applying a compression algorithm to user data to build user grammars associated with a user;
- forming at least one model by storing the user grammars in a database;
- applying the compression algorithm to at least one target block to calculate an estimated algorithmic minimum sufficient statistic;
- searching a string of data from the at least one target block for phrases matching user grammars contained in the at least one model;
- attributing a cost for phrases that are not found in the at least one model by quantifying a cost of explicitly representing symbols associated with those phrases;
- determining a degree of fit between the at least one target block and the at least one model based on the cost;
- detecting an intrusion masquerade based on the degree of fit; and
- outputting an indication of the detected intrusion masquerade.

12. The non-transitory machine-readable medium of claim 11, wherein the operations further comprise:
- sorting the user grammars so that longest phrases among the user grammars are applied first to an unclassified string.

13. The non-transitory machine-readable medium of claim 12, wherein the operations further comprise:
- replacing each matching phrase with a variable-length code value.

14. The non-transitory machine-readable medium of claim 13, wherein the variable-length code is a Huffman code.

15. The non-transitory machine-readable medium of claim 11, wherein the searching is performed in real-time.

16. The non-transitory machine-readable medium of claim 11, wherein the forming the at least one model is performed using a steepest descent method.

17. The non-transitory machine-readable medium of claim 11, wherein the at least one model comprises a healthy session model.

18. The non-transitory machine-readable medium of claim 11,
- wherein the detecting the intrusion masquerade includes calculating an inverse compression ratio over a time period for user data, and comparing the calculated inverse compression ratio to at least one inverse compression ratio associated with a compressed data set of at the least one model, and
- the detecting the intrusion masquerade event is based on a difference between the calculated inverse compression ratio and the inverse compression ratio associated with a compressed data set, the difference exceeding a threshold.

19. The non-transitory machine-readable medium of claim 11, wherein the compression algorithm is a grammar-based compression algorithm that estimates Kolmogorov complexity and that forms compressive grammar based on Minimum Description Length (MDL) principles.

20. The non-transitory machine-readable medium of claim 11, wherein the at least one target block comprises a plurality of information packets of an information system.

* * * * *